US008687543B2

(12) United States Patent  
McRae et al.

(10) Patent No.: US 8,687,543 B2  
(45) Date of Patent: Apr. 1, 2014

(54) WIRELESS CONNECTION SELECTION AND SETUP

(75) Inventors: Matthew B. McRae, Laguna Beach, CA (US); Allen J. Huotari, Garden Grove, CA (US)

(73) Assignee: Cisco Technology, Inc., San Jose, CA (US)

(*) Notice: Subject to any disclaimer, the term of this patent is extended or adjusted under 35 U.S.C. 154(b) by 977 days.

(21) Appl. No.: 11/099,046

(22) Filed: Apr. 5, 2005

(65) Prior Publication Data

US 2006/0221919 A1 Oct. 5, 2006

(51) Int. Cl.
*H04W 4/00* (2009.01)
*H04W 72/00* (2009.01)

(52) U.S. Cl.
USPC ........ 370/328; 370/331; 370/338; 455/432.2; 455/434; 455/452.2

(58) Field of Classification Search
USPC ......... 370/261, 278, 299, 352, 353, 338, 401, 370/400, 328, 331
See application file for complete search history.

(56) References Cited

U.S. PATENT DOCUMENTS

| | | | |
|---|---|---|---|
| 6,697,337 B1* | 2/2004 | Cafarelli et al. | 370/253 |
| 6,785,510 B2* | 8/2004 | Larsen | 455/11.1 |
| 6,950,655 B2* | 9/2005 | Hunkeler | 455/426.1 |
| 7,016,317 B1* | 3/2006 | Pathak et al. | 370/329 |
| 7,103,313 B2* | 9/2006 | Heinonen et al. | 455/41.2 |
| 2002/0197984 A1* | 12/2002 | Monin et al. | 455/419 |
| 2004/0068721 A1* | 4/2004 | O'Neill et al. | 717/168 |
| 2005/0083899 A1* | 4/2005 | Babbar et al. | 370/342 |
| 2005/0086368 A1* | 4/2005 | Winter | 709/239 |
| 2005/0125693 A1* | 6/2005 | Duplessis et al. | 713/201 |
| 2005/0163078 A1* | 7/2005 | Oba et al. | 370/331 |
| 2006/0045042 A1* | 3/2006 | Sethi et al. | 370/328 |
| 2006/0067214 A1* | 3/2006 | Ramachandran | 370/229 |
| 2006/0089138 A1* | 4/2006 | Smith et al. | 455/426.1 |
| 2006/0142004 A1* | 6/2006 | He et al. | 455/434 |
| 2006/0203850 A1* | 9/2006 | Johnson et al. | 370/503 |
| 2006/0223527 A1* | 10/2006 | Lee et al. | 455/432.2 |
| 2007/0135159 A1* | 6/2007 | Sinivaara | 455/552.1 |
| 2007/0189188 A1* | 8/2007 | Tuoriniemi et al. | 370/254 |

* cited by examiner

*Primary Examiner* — Brandon Renner  
(74) *Attorney, Agent, or Firm* — Haynes and Boone LLP

(57) ABSTRACT

A method for facilitating communication between a wireless client and a network is disclosed. The method comprises communicating information between the wireless client and the network prior to associating the wireless client to the network. The information can be related to setup features or services.

20 Claims, 4 Drawing Sheets

WIRELESS CONNECTION SELECTION AND SETUP

TECHNICAL FIELD

The present invention relates generally to wireless networking. The present invention relates more particularly to a method and system for enhancing wireless device setups and access point selections.

BACKGROUND

Wireless networks for both business and home use are rapidly becoming popular. Wireless networks provide convenient networking and Internet access by eliminating the need for wired connections between computers and other network devices, e.g., routers, printers, storage devices, etc.

Wireless networks are especially convenient for users of portable wireless clients, such as laptop computers, notebook computers, personal digital assistants (PDAs), and the like. Such wireless clients can easily be transported between hotspots (locations where wireless networking/Internet access is provided). New hotspots are appearing frequently at such locations as airports, malls, coffee shops, restaurants, and hotels.

The 802.11 family of standards (Wi-Fi) provide examples of contemporary wireless networks. The 802.11 family of standards is expanding to provide enhanced features, such as more channels, better security, and greater bandwidth. An increasing variety of wireless client device types based on 802.11 technologies are being developed. Many of these devices are personal computing devices. However, other types of devices, such as cameras and music recorders, are also being developed.

Connection of a wireless client to a wireless network is facilitated by an access point. Access points contain radio transceivers that provide wireless communication to wireless clients and also contain network interfaces, such as Ethernet ports, that provide wired communication to a network. An access point may optionally comprise a router and/or switch, to facilitate communication among computers on the network. For example, an access point may contain an Ethernet port that facilitates connection thereof to the Internet, such as via a cable modem or a digital subscriber line (DSL) modem, and may also contain a plurality of switched ports that each facilitates communication with one or more local area network (LAN) computers.

According to contemporary practice, a wireless client can passively discover some information regarding available wireless networks via information elements provided in the beacon that is broadcast from each access point. Alternatively, a wireless client can actively discover some information regarding a single network via a probe request directed to a specific access point. Similarly, a series of probe requests can be used to actively discover information regarding a plurality of known networks.

The information provided to wireless clients via beacons and probe responses is very simple. It is typically limited to such parameters as network name or SSID, security status, and country code information (e.g., regulatory domain)

However, in many instances it would be beneficial for the wireless client to learn more detailed information about the access point or the wireless network. For example, it would be beneficial for the wireless client to learn information regarding setup features of the access point and/or services offered by the network. Such information may allow the wireless device to intelligently select the best access point for intended use and may also allow the access point to optimize each connection on a per client basis, thus providing enhanced service to the wireless client.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION OF THE PREFERRED EMBODIMENTS

A method and system for optimizing wireless device setups and access point selections is disclosed. According to one aspect, the present invention comprises communicating information regarding a network from an access point to a wireless client and/or communicating information regarding the wireless client from the wireless client to the access point. In either instance, the information is communicated prior to the wireless client associating to the network. In this manner, such information is communicated and decisions are made based thereon prior to the wireless client associating to the network, such that the need to subsequently re-associate to a different network is mitigated.

More particularly, according to one embodiment the present invention comprises a method for facilitating communication between a wireless client and a network, wherein the method comprises communicating a beacon from an access point and the beacon comprises information regarding available setup features and/or information regarding available services.

According to another embodiment, the present invention comprises a method for facilitating communication between a wireless client and a network, wherein the method comprises communicating a probe request from a wireless client to the network and the probe request specifies setup information and/or available services.

Figure 1:
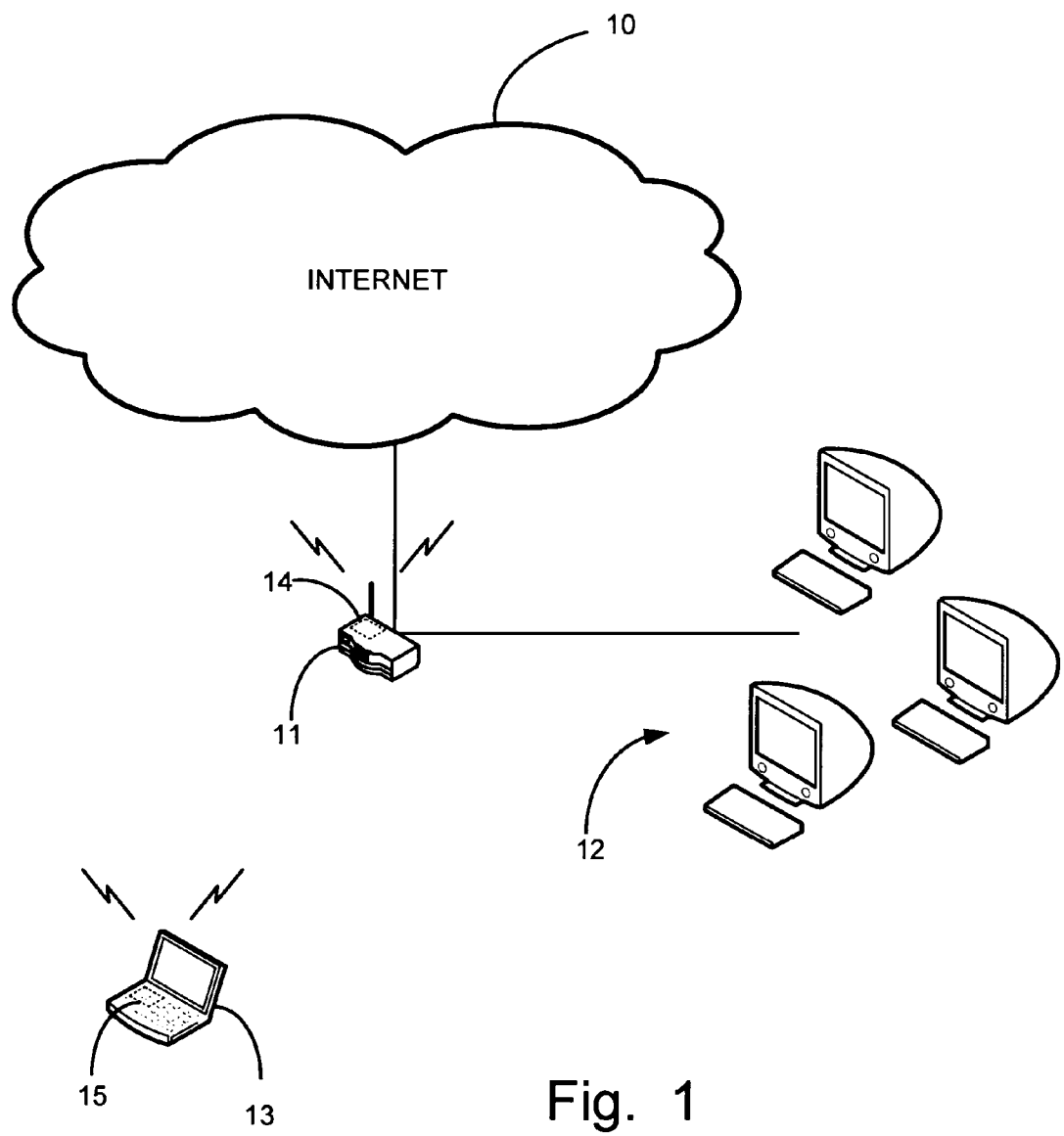
FIG. 1 is a semi-schematic drawing showing a laptop computer and an access point according to an exemplary embodiment of the present invention.

Referring now to FIG. 1, a wireless client such as a laptop computer 13 can communicate with a network, such as local area network 12 or the Internet 10, via an access point 11. Laptop computer 13 can comprise a circuit 15 for communicating a probe request. For example, circuit 15 can comprise an 802.11 transceiver.

Access point 11 can comprise a circuit 14 for communicating a beacon. For example, access point 11 can comprise an 802.11 transceiver.

As those skilled in the art can appreciate, the wireless client can alternatively be a notebook computer, a personal digital assistant (PDA), or a telephone (such as a telephone with 802.11 capabilities). Indeed, the wireless client does not need to be either portable or a computer. For example, the wireless client can alternatively be a printer, a data storage device, a camera, a music storage device (including portable music storage devices such as MP3 players and iPods), a video player, or any other device that is capable of communicating with a network. Thus, the discussion herein of a laptop computer as a wireless client is by way of example only, and not by way of limitation.

Similarly, the use of an access point as the means by which the wireless client communicates with the network is by way of example only, and not by way of limitation. Those skilled in the art can appreciate that various devices may similarly be used and that the term access point can be considered generic with respect thereto. For example, access point 11 can comprise a router, gateway or other device or combination of devices. Thus, the access point can be either a standalone device or can be integrated with one or more other devices, such as gateways, routers, or switches.

According to one aspect of the present invention, the wireless client determines whether or not it is appropriate to associate to a particular access point (and consequently to a particular network) prior to actually associating thereto. That is, the wireless client can chose to associate to a selected access point for among a plurality of available access points. This chosen access point is selected based upon the setup parameters and/or services that are available therewith. For example, the access point may be selected because it has acceptable cost, provides convenient enrollment and provides desired Internet services. In this manner, less time is wasted associating to a network, determining that the network is not suitable for the intended use, leaving the network, and finding a new network to associate to.

Information regarding setup and/or services can be communicated from the access point to the wireless client either via a beacon that is broadcast from the access point or in a probe response that is communicated from the access point to the wireless client in response to a probe request from the wireless client.

Figure 2:
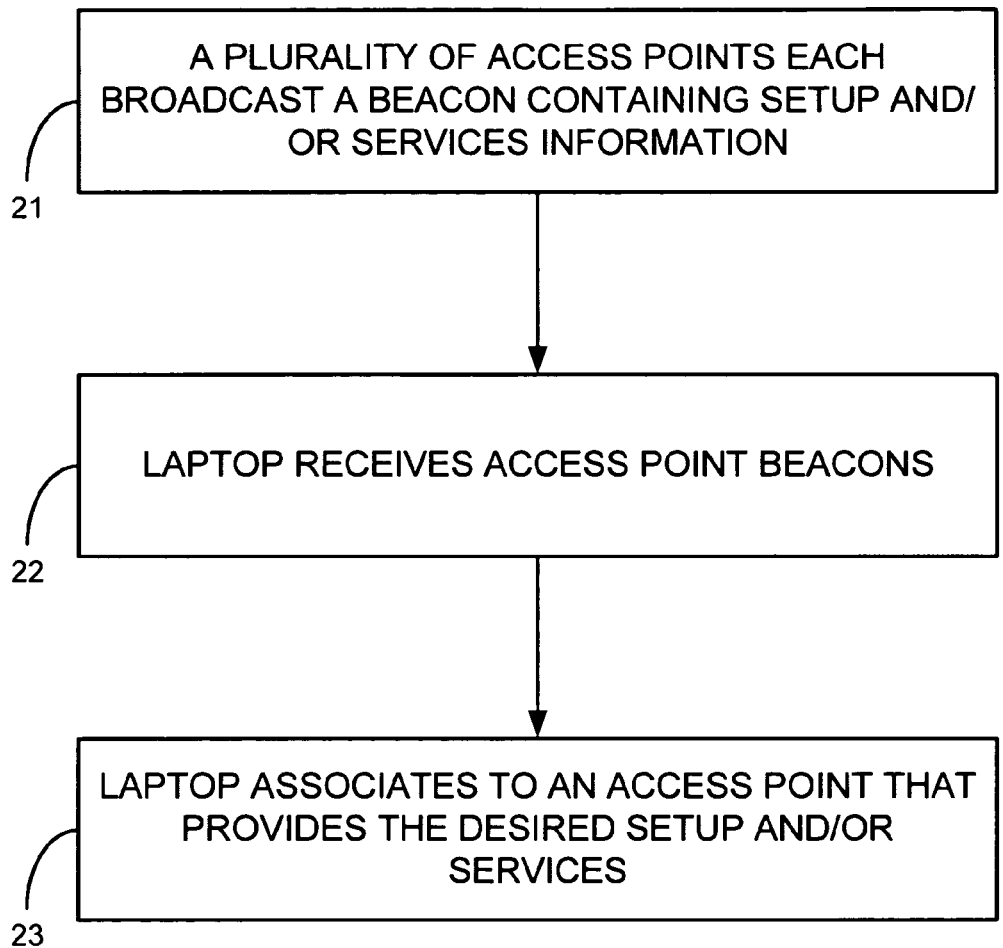
FIG. 2 is a flow chart showing the use of access point beacons according to an exemplary embodiment of the present invention.

Referring now to FIG. 2, the use of a beacon to broadcast information regarding setup and/or services is shown. A plurality of access points (an example of which is access point 11 of FIG. 1) each broadcast a beacon containing setup and/or services information, as indicated in block 21. A wireless client (such as laptop computer 13 of FIG. 1), which is within communication range (within the hotspot) of the access points, receives their beacons, as indicated in block 22.

The laptop associates to one of the broadcasting access points that provide the desired setup and/or the desired services, as indicated in block 23. The desired setup and/or the desired services can be defined by a user of the laptop, optionally before entering the hotspot. The desired setup and/or services can also be inferred from the type of wireless client, the configuration of the wireless client, the software installed on the wireless client (including both the operating system and application programs), and/or data files stored on the client.

For example, for a wireless client having only pictures (images) stored thereon, it can be inferred that a desired service is the transferring of images to a user's web site. This inference would be particularly appropriate if the wireless device is a camera or camera phone.

Figure 3:
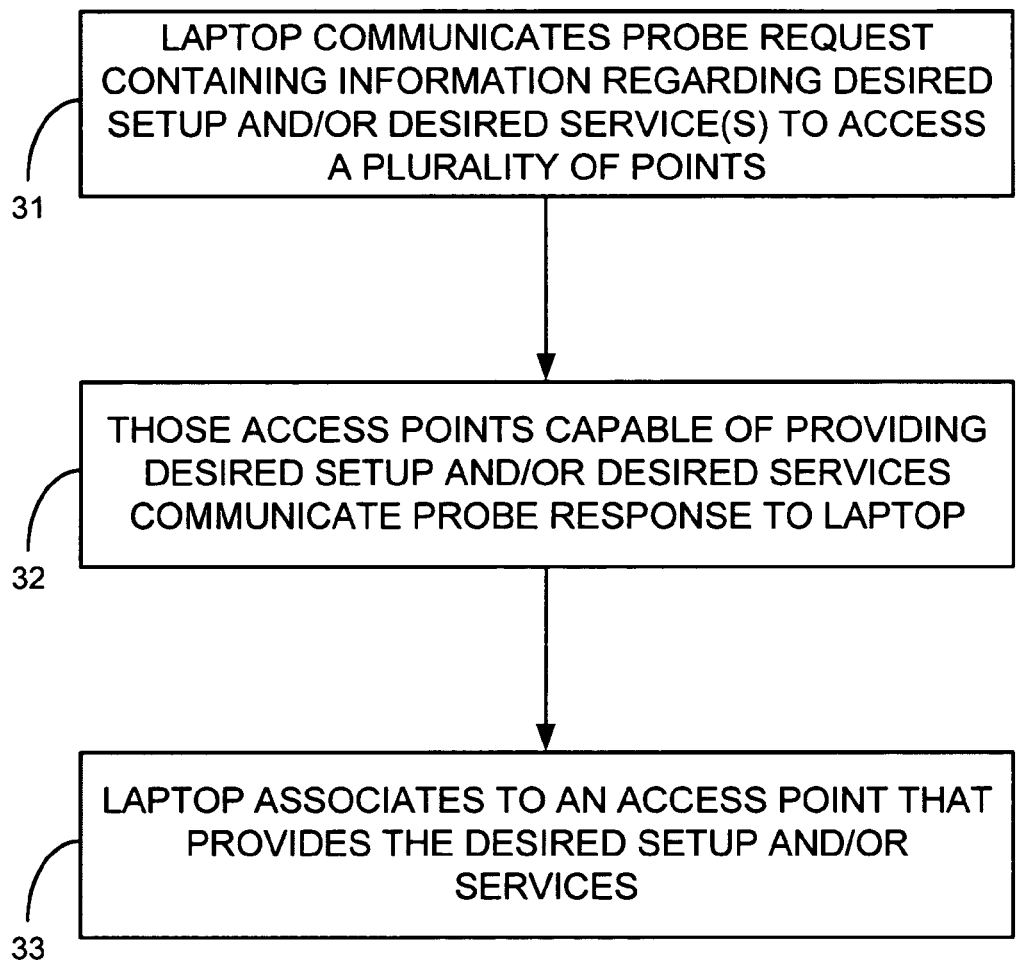
FIG. 3 is a flow chart showing the use of probe requests according to an exemplary embodiment of the present invention.

Referring now to FIG. 3, the communication of probe requests to a plurality of access points so as to obtain information regarding setup and/or services is shown. A laptop communicates a probe request to a plurality of access points as indicated in block 31. The probe request contains information regarding desired setup and/or desired service(s) for the laptop.

Those access points that are capable of providing the desired setup and/or desired service(s) communicate a probe response to the laptop computer, as indicated in block 32. Those access points that are not capable of providing the desired setup and/or desired services do not respond. The laptop computer then associates to the first access point to respond that it can provide all of the desired setup and/or services. Alternatively, the laptop computer can select from any one of the access points that respond.

Alternatively, those access points that are not capable of providing all of the desired setup and/or desired services, but are capable of providing at least some of the desired setup and/or desired services, communicate a probe response to the laptop computer. Thus, if no access point is capable of providing all of the desired setup features and/or services, then the wireless client can, if desired, associate to a selected one of the access points that is capable of providing at least some desired setup features or services.

Figure 4:
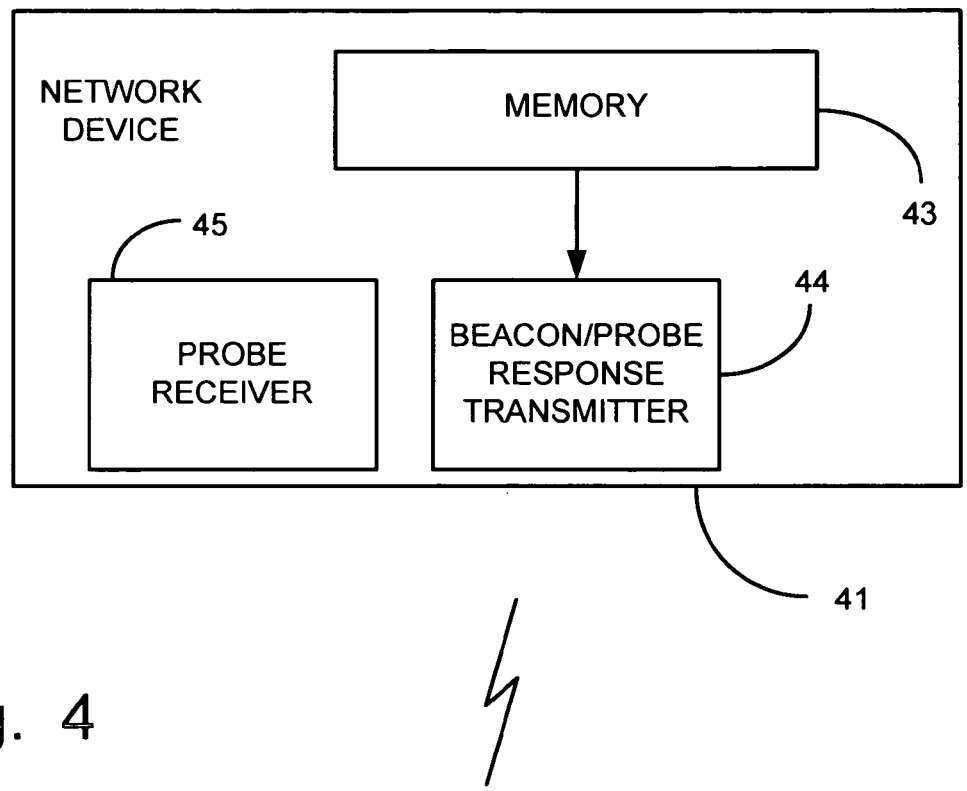
FIG. 4 is a block diagram showing an exemplary network device and wireless device, according to the present invention.

Referring now to FIG. 4, a network device 41 and a wireless device 42, are configured so as communicate prior to associating wireless device 42 to a network of network device 41. In this manner network utilization efficiency is enhanced by determining whether or not wireless device 42 should associate to the network prior to actually doing so. Thus, associations of wireless devices with networks which are not beneficial can be avoided.

One example of a suitable network device is an access point, as discussed herein. However, as those skilled in the art will appreciate, network device 41 can comprise any device that is in communication with the network and which is capable of communication with wireless device 42.

Wireless device 42 can comprise a mobile wireless device such as a laptop computer. However, as those skilled in the art will appreciate, wireless device 42 can alternatively comprise a non-mobile device such as a desktop computer.

Network device 41 comprises a memory 43 within which are stored a plurality of information elements. Memory 43 can be located outside of network device 41. These information elements are discussed in detail below. One or more information elements can be broadcast via beacon/probe response transmitter 44 as part of a beacon, so as to allow wireless device 42 to better determine if association to the network is desirable.

One or more information elements can be broadcast via beacon/probe response transmitter 44 as part of a probe response after a probe request is received by probe receiver 45 of network device 41. Again, this allows wireless device 42 to better determine if association to the network is desirable.

Beacon/probe response transmitter 44 and/or probe receiver 45 can be defined by a transceiver, such as an 802.11 transceiver. Alternatively, beacon/probe response transmitter 44 and probe receiver 45 can be any other type of transmitter and receiver.

At least one aspect of the present invention leverages the information element of the 802.11 standard so as to convey wireless client details (or preferences) to an access point. These details can be inserted into the probe request.

Similarly, at least one aspect of the present invention leverages the information element of the 802.11 standard so as to convey access point details to a wireless client. This can be inserted into the beacon and/or probe response.

The information elements can be implemented in a variety of different ways. Each information element can be implemented as a separate information element in accordance with the 802.11 specification. Similar elements can be combined into a fewer numbers of separate elements or can all be combined into a single element. In any case, the information can be encoded by the client or access point and sent in the information element(s). The access point or client can then decode the element(s) and parse out the needed or desired information.

One aspect of the present invention thus comprises extending the information element portion of the existing 802.11 specification so as to facilitate the sending of additional data about the client to the access point and for the access point to learn more about the wireless network environment so the wireless client can make better decisions about connectivity, access point selection, services, available features, etc.

Examples of information elements that can be used according to at least one aspect of the present invention are discussed below.

WAN Connection Type Information Element

The client can convey the preferred WAN connection type to wireless access points by using a WAN Connection Type Information Element in a probe request. Conversely, the access point can convey the existing WAN connection type to wireless clients by using a WAN Connection Type Information Element in a probe response or beacon. This is an information element that uses a defined syntax to communicate the preferred WAN connection type from client to access point and returns the actual WAN connection type to the wireless client. In the latter case, an access point not meeting the preferred WAN connection type may choose not to respond to the probe request from the client.

An example of syntax can be 0=dial-up, 1=basic rate ISDN, 2=DSL, 3=DOCSIS, 4=Frame, 5=Fiber, etc.

The wireless client can then use this information to configure services, including available or anticipated data rate, and thus select the best wireless network to support the intended use.

WAN Connection Speed Information Element

The client can convey the preferred WAN connection speed to wireless access points by using a WAN Connection Speed Information Element in a probe request. Conversely, the access point can convey the existing WAN connection speed to wireless clients by using a WAN Connection Speed Information Element in a probe response or beacon. This is an information element that uses a defined syntax to communicate the preferred WAN connection speed from client to access point and returns the actual WAN connection speed to the wireless client. In the latter case, an access point not meeting the preferred WAN speed may choose not to respond to the probe request from the client.

An example syntax can include two separate information fields (one for downstream, one for upstream) and can convey the provisioned connection data rate (e.g., in kilobits per second) for the access point via the information element (i.e., downstream=1024 or upstream=128).

The wireless client can then use this information to configure services, setting data rate expectations, and select the best wireless network to support the intended use. It is worthwhile to note that the information conveyed may not be actual throughput experienced on the network but the physical WAN connection rates.

NAT/NAPT Information Element

The client can convey the preferred NAT/NAPT scenario to wireless access points by using a NAT/NAPT WAN Information Element in a probe request. The access point can convey to the wireless clients whether it is located behind a NAT or NAPT device by using this information element in a probe response or beacon. This information can be important for services that the wireless client wishes to establish or use because a NAT or double NAT can block specific applications.

An example syntax can be 0=no NAT, 1=NAT present.

VPN Information Element

The client can convey the preferred VPN utilization to wireless access points by using a VPN Information Element in a probe request. The access point can convey to the wireless clients whether it supports VPN-type connections by using this information element in a probe response or beacon. This information can be important for services that the wireless client wishes to establish or use especially if VPN is required by the client or service.

An example syntax can be 0=no VPN support, 1=VPN passthrough, 2=VPN via software, 3=VPN hardware accelerated. Or the syntax can include the type of VPN connection supported by the access point such as IPSec.

QoS Information Element

The client can convey the preferred QoS support to wireless access points by using a QoS Information Element in a probe request. The access point can convey to the wireless clients whether it supports or is using QoS features by using this information element in a probe response or beacon. This information can be important for services that the wireless client wishes to establish or use and require a specific level of data rate or priority. For instance, a WiFi handset can prefer access points that have QoS turned on and have a QoS mapping on the WAN side to ensure the best call quality. Note: although 802.11e specifies that QoS capabilities of the Wireless LAN (WLAN) be advertised by an individual Access Point (AP), and that preferred QoS for a client can be conveyed via use of a Traffic Spec (TSpec), these are fundamentally indications of the local QoS between client and AP. The intent of the information element described in this section is to indicate the nature of QoS in the overall network (including upstream and/or downstream broadband connectivity).

An example syntax can be 0=no QoS support, 1=QoS LAN based only, 2=QoS on WAN only, 3=QoS on LAN and WAN. Or the syntax can include the type of QoS connection supported or active on the LAN and/or WAN.

Upstream Network Utilization of AP Information Element

The client can convey the preferred network utilization upstream of the access point utilization criteria to wireless access points by using this information element in a probe request. The access point can convey the current utilization of resources to the wireless client using this information element in a probe response or beacon. This can be an essential piece of information in the selection of the best access point. If the network upstream of the access point is over subscribed or over utilized then the service for the wireless client may be degraded or disrupted. In this case, it can be beneficial if the wireless client knew the utilization of the network resources that the access point is attached to and can choose to associate to a different access point if needed. Alternatively, an access point connected to a network not meeting the utilization criteria indicated in a probe request from a client may choose not to respond to the probe request. Note: although 802.11e specifies that utilization of the Wireless LAN (WLAN) be advertised by an individual Access Point (AP) in terms of number of attached clients and percentage of utilized (or available) capacity, these are fundamentally indications of the local utilization between client and AP. The intent of the information element described in this section is to indicate the nature of utilization in the overall network that the AP is attached to.

An example syntax for this information element can be percent utilization normalized to some number (e.g., 0=0%, 255=100%) , , , Managed Access Point Information Element The client can convey the preferred managed access point criteria to wireless access points by using a Managed access point Information Element in a probe request. The access point can convey whether or not it is remotely managed via this information element in a probe response or beacon. An access point that is remotely managed is often a better access point for a nomadic wireless client because it may have better QoS or SLAs, i.e., it is more likely to be a public access point owned/operated by a service provider. For instance, an access point from a nearby house or apartment is unlikely to be remotely managed and providing this information can help a nomadic wireless client to select the best access point. Additionally, certain services being established or used by a nomadic wireless client may require a remotely managed access point. An access point not meeting the management criteria indicated in a probe response from a client may choose not to respond to the probe request.

An example syntax can be 0=unmanaged, 1=managed

AP Owner/Operator Information Element

The client can convey the preferred access point owner/operator criteria to wireless access points by using an access point Owner/Operator Information Element in a probe request. The access point can convey its owner/operator via this information element in a probe response or beacon. The owner/operator information can be a critical bit of information when the wireless client selects an access point. For instance, if the client is a Sprint PCS dual mode (cellular/WiFi) phone and one available access point is owned/operated by Sprint PCS and the other is owned/operated by T-Mobile it is important that the wireless client select the access point owned by Sprint PCS. This can enable specific services, provide better service, and eliminate any potential roaming/network charges. As another example, if the wireless device is a Cingular dual mode phone and Cingular has a roaming agreement with T-Mobile it can be important for the wireless phone to select the T-Mobile owned access point. An access point not meeting the owned/operated criteria indicated in a probe response from a client may choose not to respond to the probe request.

An example syntax can be owner/operator=SprintPCS (or other descriptor of the owner of the AP).

AP Manufacturer Information Element

The access point can convey the manufacturer of the access point via this information element. Certain services, features, or other items may only be available on access points made by certain manufacturers and the wireless client can make a better selection with this information. Access points with known issues or incompatibilities can also be avoided.

An example syntax can be manufacturer=Linksys (or other descriptor of the manufacturer of the AP).

AP Model Information Element

The access point can convey the model of the access point via this information element. Certain services, features, or other items may only be available on certain models of access points and the wireless client can make a better selection with this information. Access points with known issues or incompatibilities can also be avoided.

An example syntax can be model=WRT54G (or other text descriptor of the model of the AP).

AP Type Information Element

The access point can convey the type of the access point via this information element. The wireless client can chose to associate with specific types of access points to reduce latency, etc. For instance, a wireless repeater can have lower bandwidth and higher latency than a wireless router connected directly to the network on the WAN side.

An example syntax can be aptype=bridge, aptype=router, aptype=repeater, etc. (or other descriptor of the type of the AP).

AP Firmware Version Information Element

The access point can convey the firmware version of the access point via this information element. Certain services, features, or other items may only be available on certain firmware versions of access points and the wireless client can make a better selection with this information. Access points with known issues or incompatibilities can also be avoided.

An example syntax can be firmware=1.2 (or other descriptor of the firmware version of the AP).

Client Service Type Information Element

The client can convey its requested service type via a Service Type information element in a probe request. The access point can convey its supported service type via a Service Type information element in a probe response or beacon. It is worthwhile to note that this can be related to the Owned/Operated information element. An access point not meeting the requested Service Type from a client may choose not to respond to the probe request.

An example syntax can be Service Type=UMA (GSM), CDMA, SIP, etc.

Furthermore, if the service type matches in a probe response or beacon, the client can include the service type in the association request (or reassociation request). In this instance, the access point can interpret a successful association as a request to setup a type of service. As examples, a UMA phone can need IPSec passthrough, while a SIP phone can need port forwarding, while either case can need a WLAN to WAN QoS mapping.

Mobile Device Type Information Element

The client can convey its requested device type via a Mobile Device Type information element in a probe request. The access point can convey it's supported device types via a Mobile Device Type information element in a probe response or beacon. It is worthwhile to note that this can be related to the Client Service information element. An access point not supporting the indicated Device Type from a client may choose not to respond to the probe request.

An example syntax can be Device Type=Phone, PDA, media adapter, etc.

Furthermore, if the Mobile Device type matches in a probe response or beacon, the client can include the Mobile Device type in the association request (or reassociation request). In this instance, the access point can interpret a successful association as a request to setup a type of service. Again, as examples, a UMA phone can need IPSec passthrough, while a SIP phone can need port forwarding, while either case can need a WLAN to WAN QoS mapping. An audio/video device may need different setup.

Mobile Device Manufacturer Information Element

The client device can convey the manufacturer of the client via this information element. Certain services, features, or other items may only be available to clients made by certain manufacturers and the access point can make a better decision with this information. Clients with known issues or incompatibilities can also be avoided.

An example syntax can be cmanufacturer=Linksys (or other descriptor of the manufacturer of the client device).

Mobile Device Model Information Element

The client device can convey the model of the device via this information element. Certain services, features, or other items may only be available on certain models of clients and the access point can make a better decision with this information. Clients with known issues or incompatibilities can also be avoided.

An example syntax can be cmodel=WIP200 (or other text descriptor of the model of the client).

Mobile Device Firmware Version Information Element

The client device can convey the firmware version of the device via this information element. Certain services, features, or other items may only be available on certain firmware versions of clients and the access point can make a better decision with this information. Clients with known issues or incompatibilities can also be avoided and the access point or SP can initiate a firmware version. This is especially true if the manufacturer, model and firmware version are known, as discussed above.

An example syntax can be cfirmware=1.2 (or other descriptor of the firmware version of the client).

Although the present invention is discussed as being used in an 802.11 environment, those skilled in the art will appreciate that one or more aspects of the present invention are suitable for use in other wireless environments. Thus, discussion herein regarding 802.11 is by way of example only, and not by way of limitation.

Although the information regarding setup features and services is discussed herein as being communicated as part of a probe request, probe response, or beacon, those skilled in the art will appreciate that such information may be communicated as part of various other information units. For example, the information may be communicated as part of association requests, re-association requests, or any other desire information units. Thus, the discussion of the communication of such information via probes requests, probe responses, or beacons is by way of example only, and not by way of limitation.

Further, the information communicated according to the present invention need not be limited to information regarding desired setup features and/or desired services. Rather, the information may comprise any information regarding the wireless client, the access point, and/or the network that facilitates enhanced operation of any of these devices, particularly when such information is communicated prior to association of the wireless client to the network. According to one aspect of the present invention, such information is used to select or help select the access point (and thus the network) to which the wireless device associates. In this manner, the connection between the wireless client and the access point can be enhanced. Further, enhanced services can be provided by the network to the wireless client, on a per client basis.

Thus, one or more aspects of the present invention allow the wireless client to learn more detailed information about the access point or the wireless network. For example, the wireless client can learn information regarding setup features of the access point and/or services offered by the network. Such information can allow the wireless device to intelligently select the best access point for intended use and may also allow the access point to optimize each connection on a per client basis, thus providing enhanced service to the wireless client. This procedure mitigates the need to change access point after the wireless client has associated to the network due to the unavailability of desired setup features and/or services.

According to one or more aspects of the present invention, the access point and/or network can learn more about the wireless client, so as to help determine if connection of the wireless client to the access point is desirable. This procedure also mitigates the need to change access point after the wireless client has associated to the network due to the unavailability of desired setup features and/or services.

Because the information is communicated prior to association, the need to associate to learn the desired information and then possibly de-associate and subsequently associate elsewhere is desirably mitigated. Further, by configuring the access point to only respond to probe requests if the access point or the network can provide at least some (or alternatively all) of the desired setup features and/or services, then the wireless client does not have to parse probe responses from access points for which associated is not desirable. Thus, according to one or more aspects of the present invention, the efficiency, effectiveness, and utility of wireless communications are enhanced.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A method of selecting a wireless access point by a wireless client, the method comprising:
  receiving one or more messages from one or more wireless access points prior to associating with the wireless access points, each of messages including first information regarding provided setups and provided services of a local area network (LAN) to which a respective wireless access point from the one or more wireless access points belongs;
  selecting a first wireless access point from the wireless access points based on the first information; and
  associating with the first wireless access point;
  wherein the first information includes:
    a connection type between the LAN and a wide area network (WAN) beyond the LAN;
    a connection speed between the LAN and the WAN; and
    a quality of service supported by the WAN.

2. The method of claim 1, further comprising:
  transmitting a request to the wireless access points prior to associating with the wireless access points, the request including second information regarding desired setups and desired services of the LAN to which the respective access point belongs;
  wherein the second information includes:
    a desired connection type between the LAN and a corresponding WAN beyond the LAN;
    a desired connection speed between the LAN and the corresponding WAN; and
    a desired quality of service supported by the corresponding WAN.

3. The method of claim 2 wherein at least one of the desired setups is included in the provided setups and one of the desired services is included in one of the provided services.

4. The method of claim 2 wherein the request includes at least one 802.11 information element.

5. The method of claim 1 wherein one of the messages includes at least one 802.11 information element.

6. The method of claim 1 wherein the first information includes information associated with one or more items selected from a group consisting of:
  client service type,
  network address translation scenario,
  network address port translation scenario,
  virtual private network utilization,
  access point upstream network utilization,
  access point management,
  access point owner,
  access point operator,
  access point manufacturer,
  access point model,
  access point type, and
  access point firmware version.

7. The method of claim 1 wherein the one or more messages are beacons.

8. The method of claim 1 wherein the one or more messages are probe responses.

9. The method of claim 2 wherein the request is a probe request.

10. The method of claim 1 wherein the wireless client is a portable wireless client.

11. The method of claim 1 wherein the wireless client is a portable computer.

12. A networking device comprising:
a memory circuit to store first information regarding provided setups and provided services supported by a local area network (LAN) to which the networking device belongs;
a receiver; and
a transmitter;
wherein:
the receiver is configured to receive a request from a wireless client prior to the wireless client associating to the networking device, the request comprising second information regarding desired setups and desired services desired by the wireless client;
the transmitter is configured to transmit a response to the request received from the wireless client, the response including at least a portion of the first information;
the first information includes:
a connection type between the LAN and a wide area network (WAN) beyond the LAN;
a connection speed between the LAN and the WAN; and
a quality of service supported by the WAN;
the second information includes:
a desired connection type between the LAN and a corresponding WAN beyond the LAN;
a desired connection speed between the LAN and the corresponding WAN; and
a desired quality of service supported by the corresponding WAN.

13. The networking device of claim 12 wherein the networking device is configured to associate with the wireless client.

14. The networking device of claim 12 wherein the networking device is an access point.

15. The networking device of claim 12 wherein the transmitter is further configured to transmit a beacon, the beacon including at least a portion of the first information.

16. The networking device of claim 12 wherein the first information includes information associated with one or more items selected from a group consisting of:
client service type,
network address translation scenario,
network address port translation scenario,
virtual private network utilization,
access point upstream network utilization,
access point management,
access point owner,
access point operator,
access point manufacturer,
access point model,
access point type, and
access point firmware version.

17. The networking device of claim 12 wherein the networking device is part of the WAN.

18. The networking device of claim 12 wherein the request includes at least one 802.11 information element.

19. The networking device of claim 12 wherein the response includes at least one 802.11 information element.

20. The networking device of claim 12 wherein at least one of the desired setups is included in the provided setups and one of the desired services is included in one of the provided services.

* * * * *